Dec. 5, 1950        L. W. METZGER        2,533,195
FUEL OIL LEAKAGE DETECTOR FOR DIESEL ENGINES
Filed Sept. 23, 1946
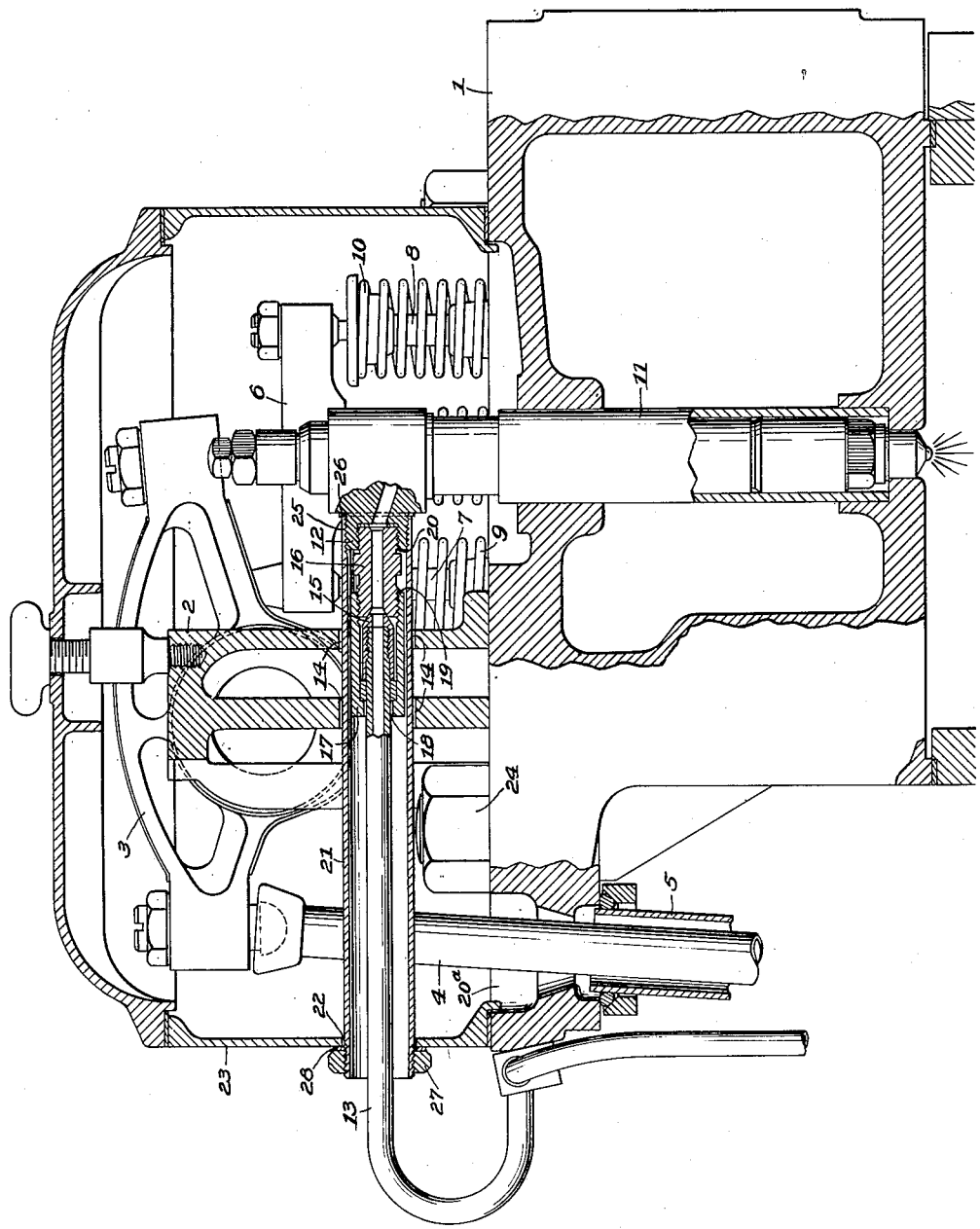
INVENTOR
LEWIS W. METZGER
BY
*Edward C. Hathaway*
ATTORNEY Patented Dec. 5, 1950

2,533,195

UNITED STATES PATENT OFFICE 2,533,195

FUEL OIL LEAKAGE DETECTOR FOR DIESEL ENGINES

Lewis W. Metzger, Doylestown, Pa., assignor to The Baldwin Locomotive Works, a corporation of Pennsylvania Application September 23, 1946, Serial No. 698,787

4 Claims. (Cl. 123—198)

My invention relates generally to internal combustion engines and more particularly to means for detecting fuel oil leakages in nozzle holder fuel inlet connections of Diesel engines and for protecting the engines against possible damage in the event of such leakage.

In Diesel engines, there are occasions when fuel oil leakages develop in the nozzle holder fuel inlet connections. These leaks may be due to weaknesses that develop in the fuel injection tubing, to the loosening of screw-threaded parts in such connections, or to defectively made parts. In many engines, as usually designed, the leaking fuel oil may find its way into the crank case of the engine and mix with the lubricating oil therein. The effect of this admixture of fuel oil and lubricating oil is to dilute the lubricating oil and impair its lubricating properties, thereby causing main bearings and other important working parts to burn out and necessitating frequent replacement thereof at an expense of time and money. In addition, such leaking fuel oil, entering other compartments of the engine, creates a hazard of fire or accidental explosion. Owing to the position of said nozzle holder, the fuel inlet connections are usually made within the valve mechanism enclosure and hence such leakages are not readily discoverable; in fact, only by periodic examinations of said connections, involving the removal of the cover of the valve mechanism enclosure, or by testing the lubricating oil in the crankcase can it be determined whether a leak exists in any of the connections. As there will be as many of these connections as there are cylinders in the engine, it is seen that it is highly desirable to have, and it is an object of my invention to provide, a simple and expedient means for readily and easily detecting these leaks, at a point external to the engine, and for preventing such leaking fuel oil from entering the engine crankcase and contaminating the lubricating oil therein.

Another object is to provide improved means to catch escaping fuel oil and divert it to an observation point outside the valve mechanism enclosure of the engine where its presence will indicate at once that a leak exists in a connection. Catching and utilizing such leaking fuel oil as a leak indicator, in the manner indicated, has the further desirable effect of automatically preventing such fuel oil from entering the crankcase of the engine and contaminating the lubricating oil therein.

A further object of my invention is to provide improved means, accomplishing the above mentioned objects, that are simple in design, light in weight, and inexpensive in construction and that will, among other things, promptly and positively indicate the presence of leakage in any enclosed or inaccessible connection so that repairs may be promptly instituted to prevent bearings from being burned out through dilution of the lubricating oil by such leaking fuel oil, as explained above.

Other objects and advantages will be more apparent to those skilled in the art from the following description of the accompanying drawing which is a vertical sectional view through the center of the cylinder head and valve mechanism of one cylinder of a Diesel engine employing my invention.

In the particular embodiment of the invention which is disclosed herein merely for the purpose of illustrating one specific form among possible others that the invention might take in practice, I show in the drawing a usual fuel injection apparatus and valve mechanism of one cylinder of a Diesel engine, comprising in the main a cylinder head 1, a fulcrum bracket 2, mounted on the cylinder head, a valve lever 3, pivoted on said bracket, a push rod 4, in engagement with one end of said lever, and enclosed in a loose-fitting push rod tube 5, a bridge 6, positioned at the other end of said lever, valves 7 and 8, and valve springs 9 and 10, all in engagement with said bridge. The fuel injector or spray nozzle holder 11 is of usual design, except that it has greater length in its body in order that the horizontal extension 12 thereof, through which the fuel oil is injected, will be at a greater height above the cylinder head than it is at present. This is so that the sleeve, hereinafter described, may avoid obstructions on the top of the cylinder head. Instead of placing the high pressure fuel injection tubing 13 in a vertical position and connecting it with nozzle holder 11 by means of a vertically disposed nozzle holder adapter, screw-threaded into horizontal extension 12 of the nozzle holder, I dispose the fuel injection tubing 13 in a horizontal position, as shown in the drawing, running it through recesses 14, 14 in fulcrum bracket 2, and connect it to nozzle holder extension 12 by means of horizontally disposed adapter connections 15 and 16, screw-threaded respectively onto the end of said tubing and into said nozzle holder extension 12. A hexagonal gland nut 17 on tubing 13, holds the two adapters 15 and 16 in contact with each other by being screw-threaded to adapter 16. Except as herein mentioned, all the aforementioned parts of the nozzle holder fuel inlet connection and their arrangement with respect to each other are well-known in the fuel injection apparatus of Diesel engines of this general type and do not form any part of this invention.

Leakages of fuel oil may occur at any or all the points 18, 19 and 20 of the connection. If unimpeded, the leaking fuel oil would flow onto the top of cylinder head 1, into a recess 29a therein, through which push rod 4 reciprocates, into and down push rod tube 5, and ultimately into the engine crankcase to contaminate and dilute the lubricating oil therein, impair its lubricating properties and cause bearings of the engine to burn out or to be the cause of crankcase explosion.

To remedy the foregoing conditions and to utilize the escaping fuel oil as an indicator of such leakage, I surround the nozzle connection with a horizontally disposed tube or sleeve 21, open at its outer end. This sleeve extends outwardly across the top of the cylinder head sufficiently for it to pass through and extend slightly beyond a hole 22 in a wall of the valve mechanism cover 23, so that the outer end of said sleeve will be within view of the operator of the engine while the inner end and its nozzle connections are located internally of some portion of the engine, specifically the valve cover 23. This sleeve may be of a rigid or flexible construction so that if flexible it can be easily turned to avoid obstructions on the top of the cylinder head 11 as, for example, nut 24. Attachment of the ends of sleeve 21 to extension 12 of nozzle holder 11 and to the wall of valve mechanism enclosure 23 may be made in various ways. In the accompanying drawing I show attachment of the inner end of sleeve 21 to extension 12 by means of screw threads 25 while a gasket 26, placed between the end of said sleeve and a flat surface of nozzle holder 11, is used to insure an effective seal of this end of the sleeve. Attachment of the outer end of said sleeve to the wall of valve mechanism enclosure 23, as shown in the drawing, is made by means of a nut 27, screw-threaded onto that portion of the end of said sleeve that extends beyond said enclosure wall, a gasket 28 on the sleeve between nut 27 and the outside of said wall serving to retain within the valve mechanism enclosure any lubricating oil that may be thrown off by the rapidly moving valve mechanism. I preferably use a tube or sleeve, rather than a trough or other open conduit, so that this lubricating oil will be excluded from the sleeve and not thereby be mistaken for leaking fuel oil. A trough, or other open conduit may, however, be employed in a case where only the leaking fluid is involved. It is obvious that sleeve 21 need not be perfectly horizontal, but may be placed with its outer end higher or lower than its inner end.

Operation: Fuel oil leaking from any of the points 18, 19 or 20 of a connection is caught within the sealed end of sleeve 21 and, as it accumulates therein, starts flowing toward and out of the open end of said sleeve. The operator, seeing the flow or drip at the end of the sleeve, is apprised at once that a fuel oil leak has developed in the particular connection with which the sleeve is in engagement. He has not been required to remove the cover of the valve mechanism enclosure and make an examination of the connections, as above explained, in order to determine whether or not a leak is present, for it is only when there is a leak in such connection that oil flows or drips from the end of the sleeve. The amount of flow or drip of fuel also apprises the operator of the extent of the leak and whether immediate repairs are advisable. Gland nut 17, being hexagonal, permits ready passage of fuel oil leaking from points 19 and 20.

It is seen that the escaping fuel oil, thus caught and carried, by means of the sleeve, to a point outside the engine where its presence serves to indicate that a leak exists, cannot now flow onto the top of cylinder head 1 and into the crankcase of the engine to contaminate and dilute the lubricating oil therein. Thus, said sleeve serves a dual purpose; first, in indicating the presence and cylinder location of any leakages and, second, in preventing leaking fuel oil from entering the crankcase and contaminating the lubricating oil therein. Also, by drawing off such escaping fuel oil to a place of safety the possibility of fire or accidental explosion is eliminated.

If the outer end of said sleeve is placed slightly lower than the inner end, the effect would be to accelerate the flow of leaking fuel oil to the open end of the sleeve and thus to indicate sooner that a leak exists in the particular connection. Also, if the sleeve is so disposed, it is not necessary to seal the inner end of the sleeve, as fuel oil leaking from the connection onto the inclined inner surface of the sleeve is immediately carried to the open end of the sleeve by gravity. As indicated above, however, if the conduit is left open drops of lubricating oil might find their way into the conduit and mislead the operator into believing that a leak exists in the connection. If the outer end of the sleeve is placed slightly higher than the inner end, the effect is to delay the initial appearance of the leaking fuel oil at the open end of the sleeve until the accumulating oil in the sleeve has reached the level of the open end thereof and has begun flowing or dripping out. In other words, there would be no indication of the leak in the connection until some time after it had started.

The sleeve may be easily and readily removed to inspect, tighten or replace the parts of the nozzle holder fuel inlet connection in the event that this tell-tale sleeve indicates that a leak exists. After removing the cover of the valve mechanism enclosure, nut 27 and gasket 28 are removed or loosened. The sleeve is then unscrewed from the nozzle holder extension 12 and pushed back along fuel injection tubing 13 until the parts of said connection are exposed, the said tubing being extended sufficiently to accommodate the sleeve when so displaced, as shown in the drawing. Assembly of the sleeve is made by taking the same steps but in reverse order.

From the disclosure herein, it is seen that I have provided a simple, reliable and efficient means for readily and easily detecting leakages from enclosed or inaccessible connections that join fluid-carrying members by collecting and utilizing the escaping fluid as an indicator that a leak exists, also, for excluding such leaking fuel oil from the engine crankcase, and for eliminating the hazard of fire or accidental explosion in or about the engine.

It will, of course, be understood by those skilled in the art that various changes may be made in the construction and arrangement of parts without departing from the spirit of the invention as set forth in the appended claims.

I claim:

1. In a Diesel engine having a nozzle holder, and horizontal injection tubing extending through an internal portion of the engine for connection to the holder, and a horizontal sleeve also extending through said hollow portion and disposed about the fuel injection tubing, the inner end of said sleeve being attached to the nozzle holder and its outer end being open and extended to a point outside the engine, the injection tubing extending axially through said open end of the sleeve whereby leakage of fuel from the connection may be observed.

2. In an engine having a fuel injector enclosed within a cover, a horizontal fuel supply pipe connected to said injector internally of the cover, a sleeve surrounding said supply pipe and extending from said injector to a point outside of the cover, and means for substantially closing the inner end of said sleeve while its outer end is open, said fuel supply pipe extending axially through the open end of said tube, whereby leakage of fuel anywhere within said surrounding sleeve will be carried to the open end thereof where it can be observed.

3. In an engine having a vertically extending nozzle holder located at an internal point of the engine, a fuel supply pipe connected thereto at said internal point, a sleeve enclosing said supply pipe, means for sealing the inner end of said sleeve at a point near the nozzle holder while the other end of the sleeve is open and extends to a desired point externally of the engine, the supply pipe extending axially out through the open end of said tube, whereby fuel leakage within the length of said sleeve will discharge at said open end to be observed.

4. In an engine having a cylinder head, a fuel injector in the top thereof having a lateral fuel supply connection, and a passageway leading downwardly from the top of the cylinder head for communication normally with the engine crank case, the combination, comprising, a conduit connected at one end to said fuel injector and extending laterally beyond said downwardly extending passageway and terminating in an open outer end, and a fuel supply pipe extending into said conduit through its outer open end and connected to said fuel injector to supply fuel thereto, whereby leakage of fuel supplied to the injector may drain through the outer open end of the conduit and thereby be observed.

LEWIS W. METZGER.

REFERENCES CITED

The following references are of record in the file of this patent:

UNITED STATES PATENTS

| Number | Name | Date |
|--------|------|------|
| 354,414 | Harvey | Dec. 14, 1886 |
| 1,854,190 | Herr | Apr. 19, 1932 |
| 2,423,181 | Emery | July 1, 1947 |